US012486441B2

United States Patent
Sieranc et al.

(10) Patent No.: US 12,486,441 B2
(45) Date of Patent: Dec. 2, 2025

(54) BINDING AGENT FOR CELLULOSE CONTAINING MATERIALS AND THE PRODUCT CONTAINING IT

(71) Applicant: BAKELITE POLSKA SPOLKA Z ORGANICZONA ODPOWIEDZIALNOSCIA, Cracow (PL)

(72) Inventors: Anna Sieranc, Zaborze (PL); Paula Barylak, Gliwice (PL)

(73) Assignee: BAKELITE POLSKA SPOLKA Z ORGANICZONA ODPOWIEDZIALNOSCIA, Cracow (PL)

( * ) Notice: Subject to any disclaimer, the term of this patent is extended or adjusted under 35 U.S.C. 154(b) by 0 days.

(21) Appl. No.: 17/778,129

(22) PCT Filed: Nov. 19, 2020

(86) PCT No.: PCT/PL2020/050084
§ 371 (c)(1),
(2) Date: May 19, 2022

(87) PCT Pub. No.: WO2021/101396
PCT Pub. Date: May 27, 2021

(65) Prior Publication Data
US 2023/0125098 A1    Apr. 27, 2023

(30) Foreign Application Priority Data
Nov. 19, 2019   (LU) .................................... 101487

(51) Int. Cl.
| | | |
|---|---|---|
| C08K 5/053 | (2006.01) | |
| C09J 189/00 | (2006.01) | |
| C08K 5/06 | (2006.01) | |

(52) U.S. Cl.
CPC ........... C09J 189/005 (2013.01); C08K 5/053 (2013.01); C08K 5/06 (2013.01)

(58) Field of Classification Search
CPC ..... C09J 189/005; C09J 189/00; C08K 5/053; C08K 5/06; C08L 89/00
See application file for complete search history.

(56) References Cited

U.S. PATENT DOCUMENTS

| | | | |
|---|---|---|---|
| 3,619,222 A | 11/1971 | Werle et al. | |
| 6,284,838 B1 * | 9/2001 | Silbiger | C08L 97/005 524/72 |

(Continued)

FOREIGN PATENT DOCUMENTS

| | | |
|---|---|---|
| CN | 105542709 A | 5/2016 |
| EP | 3219756 A1 | 9/2017 |

(Continued)

OTHER PUBLICATIONS

Croda ("Synperonic NCA Series", 2009) (Year: 2009).*

(Continued)

Primary Examiner — Jiangtian Xu
(74) Attorney, Agent, or Firm — Leber IP Law (57) ABSTRACT

An easy to use and store environmentally friendly binding agent for cellulose-containing materials, particularly suitable for use in the production of wood composites, and composite material product obtained by the use of this binding agent is disclosed.

28 Claims, 6 Drawing Sheets

State of the art (56) References Cited

U.S. PATENT DOCUMENTS

| | | | | |
|---|---|---|---|---|
| 2010/0240805 A1* | 9/2010 | Miller | ............ | C09J 125/14 |
| | | | | 524/21 |
| 2015/0048554 A1 | 2/2015 | Karrer et al. | | |
| 2016/0130533 A1* | 5/2016 | Castle | ............ | C11D 3/0036 |
| | | | | 510/400 |
| 2016/0257815 A1* | 9/2016 | Varnell | ............ | C08L 97/02 |
| 2019/0119500 A1* | 4/2019 | Edelmann | ............ | C08L 61/00 |

FOREIGN PATENT DOCUMENTS

| | | | |
|---|---|---|---|
| JP | H07 70543 A | | 3/1995 |
| JP | H0770543 | * | 3/1995 |

OTHER PUBLICATIONS

Vortec ("Vortec 2014 Catalog", https://www.newmantools.com/vortec/Vortec_2014_nt_Catalog.pdf) (Year: 2014).*

PCT Application No. PCT/PL2020/050084, International Search Report mailed Mar. 15, 2021, 14 pages.

Pfleiderer Solekol Sp. Z O. O, "Silekol 140 Adhesive Resin", Product Card, Jan. 1, 2019, 2 pages.

B. B. Adhikari, M. Chae, and D. C. Bressler, "Utilization of Slaughterhouse Waste in Value-Added Applications: Recent Advances in the Development of Wood Adhesives", Polymers (Basel)., vol. 10, No. 2, 2018, Published Feb. 11, 2018, doi:10.3390/polym10020176, 28 pages.

M. Guan, et al., "Alkali- and glutaraldehyde-modified pig blood as renewable adhesives for engineered bamboo products", J. Adhes. Sci. Technol., 2020, Published online Sep. 25, 2020, doi: 10.1080/01694243.2020.1824364, 17 pages.

"Structure and Properties of Gelatin", EScholalry Community Encyclopedia, [online] retrieved May 13, 2025 from <https://encyclopedia.pub/entry/44735>, 7 pages.

C.J.R. Verbeek and L. E. van den Berg, "Development of Proteinous Bioplastics Using Bloodmeal", J. Polym. Environ., vol. 19, No. 1, pp. 1-10, 2011, Published online Aug. 18, 2010, doi: 10.1007/s10924-010-0232-x, 10 pages.

H. Lin and S. Gunasekaran, "Cow Blood Adhesive: Characterization of Physicochemical and Adhesion Properties", Int. J. Adhes. Adhes., vol. 30, No. 3, pp. 139-144, Apr. 2010, doi: 10.1016/j.ijadhadh.2009.10.003, 6 pages.

M. Walczycka and T. Kolczak, "The influence of pH and sodium chloride on the thermal denaturation of oxy- and methemoglobin," Food Science Technology Quality, vol. 11, 2004, Retrieved May 14, 2025, 13 pages.

H. Sakai, S. Takeoka, H. Yokohama, Y. Seino, H. Nishide, and E. Tsuchida, "Purification of Concentrated Hemoglobin Using Organic Solvent and Heat Treatment", Protein Expression and Purification, vol. 4, No. 6. pp. 563-569, Dec. 1993, doi: 10.1006/prep.1993.1074, 7 pages.

"Gelatin", Water Structure and Science [online], retrieved May 14, 2025 from <https://water.lsbu.ac.uk/water/gelatin.html>, 3 pages.

"Gelatin", ChecmBAN, [online] retrieved May 13, 2025 from <https://chembam.com/resources-for-students/the-chemistry-of/gelatin/>, 3 pages.

Oner Ülker, "Wood Adhesives and Bonding Theory," Adhesives: Applications and Properties, InTechOpen, Nov. 23, 2016, doi: 10.5772/65759, 19 pages.

* cited by examiner

BINDING AGENT FOR CELLULOSE CONTAINING MATERIALS AND THE PRODUCT CONTAINING IT

The invention relates to an environmentally friendly binding agent, in particular an adhesive composition, for materials containing cellulose, in particular for use in the production of wood composites.

The disclosed formaldehyde-free binding agent for cellulose-containing materials can replace the commercially available toxic urea-formaldehyde adhesives. In the light of the latest research, formaldehyde found in current resins has carcinogenic and mutagenic properties, with very high acute inhalation toxicity: 3.1 mg/l. The global demand for glued wood products is constantly increasing, and the resources of raw materials for the production of urea-formaldehyde adhesives, such as oil, are decreasing, which makes them more and more expensive. The formulas developed are not the first ones that do not contain formaldehyde, but they are the first binders that are able to compete technologically and cost-wise with urea-formaldehyde and melamine-urea-formaldehyde adhesives.

Figure 1:
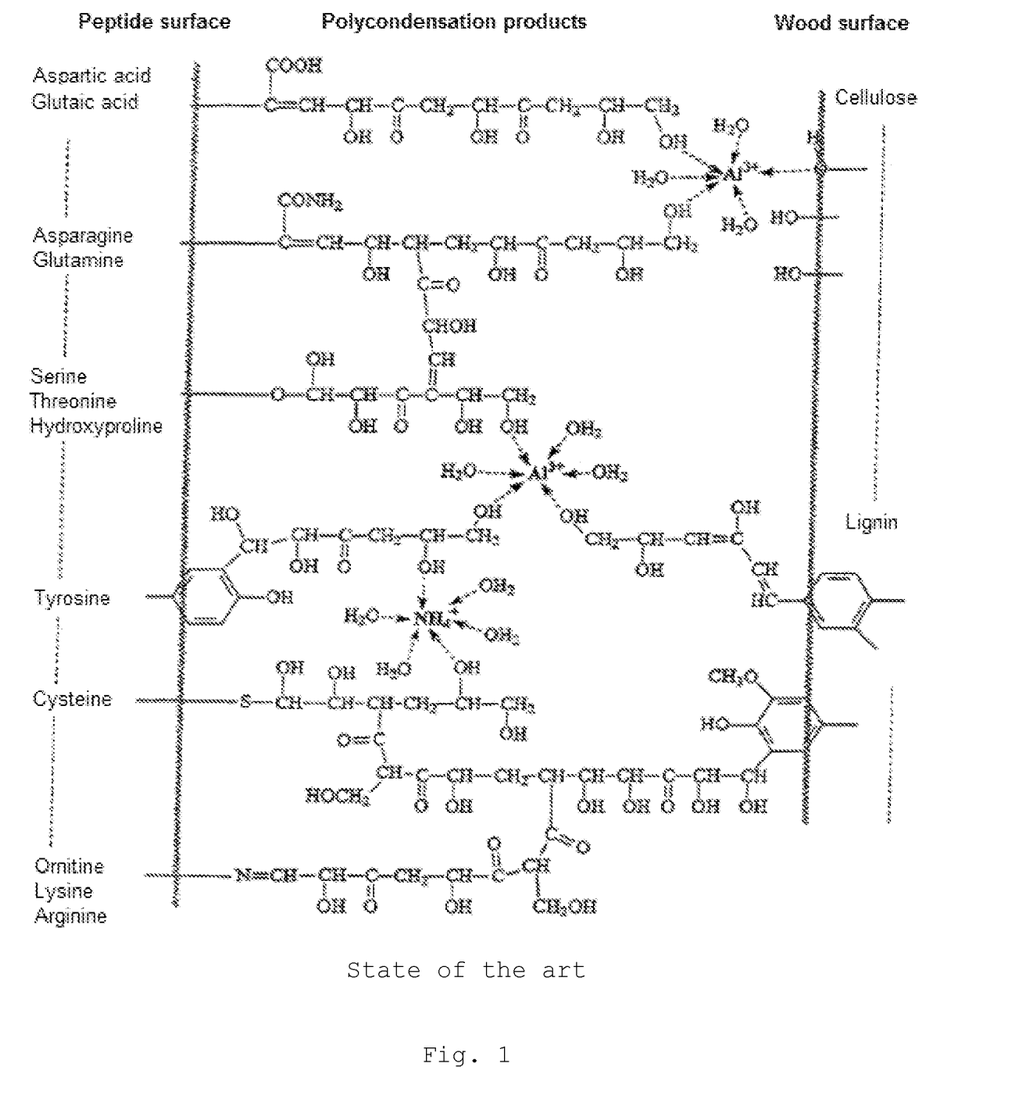
FIG. 1 is the mode of action of the known adhesive.

Patent EP3219756 discloses a formaldehyde-free binding agent for cellulose-containing materials consisting of a resin made of hydroxyaldehyde polycondensed with an ammonium salt. In the known solution, hydroxyaldehydes, and especially glyceraldehyde, are produced in situ within the binder from alcohols containing at least two hydroxyl groups (polyols) by a mild oxidizing agent. Hydrogen peroxide is particularly used as the oxidizing agent. In the described embodiment, glycerin and hydrogen peroxide are present in the known binder to form hydroxyaldehyde in situ, i.e. glyceraldehyde, which then reacts with the ammonium salt and possibly further substances in the binder mixture to form a hydroxyaldehyde resin. It binds by use of heat and pressure throughout the entire reaction. The mode of action of the known adhesive is shown in FIG. 1. The primary components of the resulting binding agent are linked in the final structure by covalent bonds, and for its effective operation the presence of an ammonium salt is necessary.

The purpose of the invention is to provide an alternative binding agent for cellulose-containing materials, which would be based on more environmentally friendly, easily accessible and bio-renewable components, in particular it did not contain ammonium salt, while meeting the requirements and standards applicable to products based on urea-formaldehyde resins, especially such as binder strength and water resistance. It is also desirable that the resulting binding agent can be prepared and stored in the form of a ready-to-use adhesive composition constituting a single mixture, which can then be used directly in the manufacture of products from composite materials such as chipboard.

The selection of ingredients that can be used in formula combinations focuses mainly on areas of natural and renewable raw materials, taking into account that their use does not disturb the ecological balance. It is essential when choosing raw materials that they are not toxic, carcinogenic or mutagenic. It is desirable that a binder completely safe for health can be obtained, using as much as possible raw materials occurring as residues from various industrial processes. The main purpose is to prepare an industrial adhesive not only without the use of formaldehyde and isocyanates, giving the opportunity to produce products with minimal emission of formaldehyde of natural origin, but also based solely on bio-renewable components and completely biodegradable, and at the same time suppressing the emission of formaldehyde by the products obtained with its use.

Such an object was surprisingly achieved in the present invention.

An object of the invention is a formaldehyde-free binding agent for cellulose-containing materials characterized in that it is a composition comprising:
  a protein component of animal origin in an amount of 5% to 25%,
  polyhydric alcohol containing from 2 to 6 —OH groups, especially selected from the group containing glycerin and sorbitol, in an amount of 5% to 45%, preferably glycerin in an amount of 14% to 40%,
  water up to 100%,
wherein said composition does not contain an ammonium salt.

Preferably, the binding agent according to the invention has at least one of the following characteristics:
  it additionally contains a defoaming agent in an amount not exceeding 5%, preferably from 1% to 2%, most preferably below 0.5%;
  it additionally contains urea in an amount of 0% to 36%, preferably in an amount of 16% to 36%;
  it additionally contains sorbitol in an amount of 1% to 22%, preferably in an amount of 10% to 22%;
  it additionally contains casein in an amount of 0.2% to 4%, preferably in an amount of 2% to 4%;
  it additionally contains gluten in an amount of 0.5% to 7%, preferably in an amount of 3% to 7%;
  it additionally contains NaOH in an amount of 0.1% to 2%, preferably in an amount of 1% to 2%;
  it additionally contains $KMnO_4$ in an amount of 0.4% to 3%, preferably in an amount of 1% to 3%;
  it additionally contains molasses in an amount of 1% to 8%, preferably in an amount of 4% to 6%;
  it additionally contains a vegetable oil in an amount of 0.5% to 10%, preferably in an amount of 2.5% to 7.5%;
  the protein component is based on animal blood, preferably it contains a protein concentrate from animal blood, especially hemoglobin from animal blood,
  the defoaming agent contains a mixture of alkoxylated fatty alcohols, preferably ethoxylated and/or propoxylated C16-C18 alcohols.

Another object of the invention is a composite material product obtainable by binding the cellulose-containing starting material to the binding agent of the invention and forming into a product.

Preferably, the starting material is: wood, especially wood fiber or wood chips, straw from cereals, rice, rapeseed, poppy, corn, flax, sunflower and/or paper.

Preferably, the product of the composite material according to the invention is in the form of a board, in particular a pressed board or a laminate.

DETAILED DESCRIPTION OF THE INVENTION

The binder for cellulose-containing materials contains:
a) Polyols Containing from 2 to 6 —OH Groups
  polyhydric alcohols containing from 2 to 6 —OH groups, in particular 1,2-polyols. Glycerin and sorbitol are particularly preferred. It is preferable to use solutions with a content of 70-98%. It is particularly preferred to use glycerin with a content of 80-85% by weight. The amount of polyol component in the binding agents of the present invention is from 5 to 45% parts per hundred parts of the binding agent. More preferably, 15 to 25% is used. The final choice of polyol used depends on the particular application and the desired final adhesive properties.
b) a Protein Component of Animal Origin
  protein component of animal origin may be any animal protein or a mixture thereof, for example: casein, milk protein polymers, processed poultry blood proteins, animal blood products, hydrolyzed protein and feather meal, pork hair meal, processed protein animal (meat meal), meat and bone meal, hydrolyzed proteins from the porcine intestinal mucosa, protein concentrate from animal blood and/or pork protein. Preferably, it is used in the form of a powder. Most preferably, hemoglobin is used (e.g. in the form of a commercially available dried blood cell preparation). The amount of the protein component in the binding agent according to the invention is in the range from 5 to 30%.
c) Defoaming Agent
  any of the known defoaming agents intended for use in aqueous systems, preferably silicone-free, can be used as the defoaming agent. In a preferred embodiment, the defoaming agent composition may be a mixture of hydrophobic active ingredients containing a mineral oil and a non-ionic emulsifier, suitable for use in the form of an aqueous emulsion. In an exemplary embodiment, it is a mixture based on alkoxylated fatty alcohols. Preferably, it contains ethoxylated and/or propoxylated C16-18 alcohols [CAS 68002-96-0], in particular in a concentration above 50%. Examples of such defoaming agents are the commercially available preparations: defomiks 2810, romis 103, romis 130, romis 116, romis zd-7, romis k200, romis fa310 or romis mp10/bs offered by the company ROWIS SYSTEM SP.J. Defoaming agents containing alkoxylated fatty alcohols are particularly preferred. In the binder according to the invention, the defoaming agent can be used in an amount of up to 5% by weight of the total composition, preferably 1-2%, preferably less than 0.5%.

In addition, depending on the applications selected, especially the type of material to be glued, the composite product being manufactured and the requirements associated with the selected production process, it may be advantageous to use additional components such as an amide compound, especially urea, casein, gluten, NaOH or $KMnO_4$. The role of these ingredients and their effect on binding agent properties is discussed in more detail in the examples below.

Surprisingly, it turned out that it is possible to obtain a binding agent that meets the necessary requirements for mechanical strength and water resistance, which is also a completely biodegradable product based on bio-renewable and easily accessible substrates. It also does not contain any ingredients that could overload the environment. Not only the use of formaldehyde has been eliminated, but also the addition of ammonium salts used in known solutions.

The use of a defoaming agent, the role of which in the claimed binder is not limited to the reduction or elimination of the formation of protein foam during mixing of the adhesive components, also brought unexpectedly beneficial effects. The use of a defoaming agent also prevents the depletion of the amount of protein present in the final binder mixture. It turned out that the foam is mainly made up of the protein component. It was found that the mechanical removal of protein foam in the process of glue preparation affects the deterioration of the parameters of final products, reducing the strength parameters (PN-EN 319) and swelling after soaking in water (PN-EN 317). The lack of a defoaming agent also reduces the amount of solids in the finished formula (removed with the foam), which reduces the possibility of its use in the industrial production of wood-based products, and in the case of plywood, it prevents its use at all, by significantly reducing the viscosity of the adhesive (50 mPa*s) instead of the desired at least 450 mPa*s).

Figure 2:
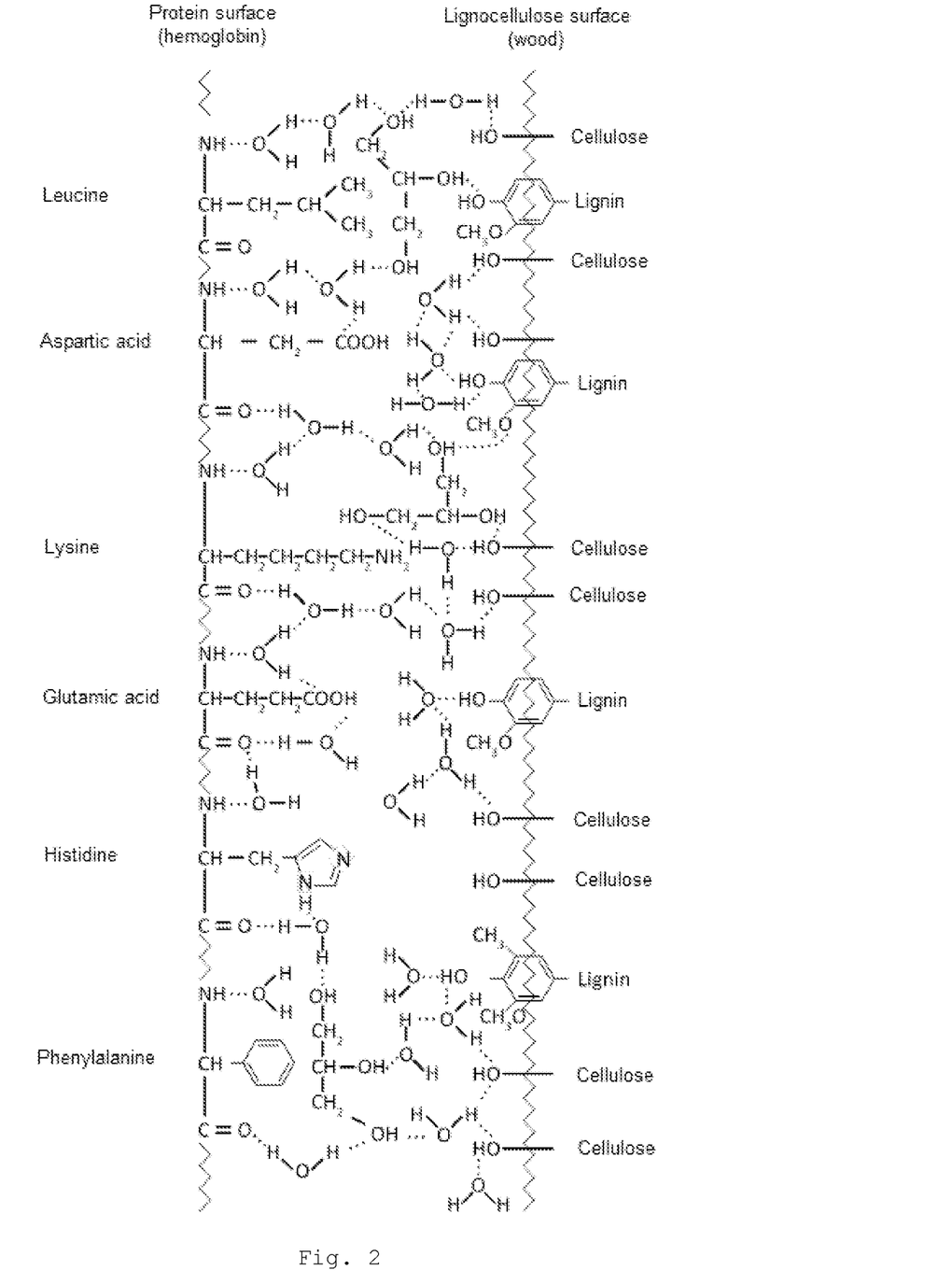
FIG. 2 demonstrates the action of the adhesive according to the invention.

What is also surprising, the components of the adhesive according to the invention do not form covalent bonds when obtaining the joint, in particular they do not undergo (poly) condensation reaction. The action of the adhesive according to the invention is explained in FIG. 2. The following intermolecular interactions may occur between the adhesive components: hydrogen bonds, permanent dipole-permanent dipole, van der Waals and dispersion (induced dipole-induced dipole). It seems that hydrogen bond plays the largest role among the mentioned interactions. All adhesive components are capable of interacting on a hydrogen bonding basis under competitive conditions.

Presumably, due to the almost twice higher concentration of animal protein in the adhesive, protein aggregation or entanglement of protein chain fragments may play a role. Tangling of protein chains (or their fragments) can occur during high temperature pressing under increased board pressure (large oscillations of free vibrations of chain fragments are possible). It seems that intermolecular interactions play an important function at the stage of adhesive preparation, its durability over time, or when applied to wood fiber. They also affect the properties of fiberboard obtained using adhesive. Due to the fact that wood fiber is a porous material, after applying the adhesive to the fiber, penetration into the free spaces occurs, followed by infiltration—even deeper penetration into the wall cell. However, only small adhesive components capable of forming hydrogen bonds can undergo infiltration. In the adhesives according to the invention these may be urea, glycerin and water. In order to achieve the desired mechanical properties of wood binding, it seems that it is necessary for penetration and infiltration processes to occur. Most often, the boundary layer between wood fiber and adhesive is the weakest point of connection due to the formation of strains in this place. Simply put, the source of these strains are two opposing phenomena: swelling of the wood fiber under the influence of water and a decrease in the volume of glue due to water loss during penetration, infiltration and a time-distant heating process during board formation. The above processes change the composition and properties of the adhesive and the properties of wood. Contraction of the adhesive volume has a positive effect on cohesion, but it can also cause gaps. If the infiltration process occurs, then chains of intermolecular interactions are formed from the cell wall of the wood to the layer of clean adhesive, which are responsible for adhesion. The binding of wood is influenced by adhesion and cohesion.

The process of pressing under increased pressure and high temperature has a significant impact on the properties of wood fiber and adhesive during forming the board. When heating the mixed board components, heat is transported from the surface to the center of the mat, via steam generated in situ. Under increased pressure, the molecules of adhesive and wood components are brought closer together, which promotes intermolecular van der Waals and dipole-dipole interactions. On the other hand, the elevated temperature denatures the protein irreversibly and breaks the hydrogen bonds, which are formed again after lowering the temperature (not necessarily between the same fragments of molecules). The weight of solids in the adhesive increases, which is positive from the point of view of wood binding.

The application of the invention has several advantages for processing wood-based materials.

The products obtained with its application meet the established standards in force for products manufactured on the basis of urea-formaldehyde resins, and at the same time do not contain formaldehyde. The binding agent according to the invention is prepared on the basis of rapidly renewable, widely available natural raw materials. This enables full recycling of wood-based materials obtained with its participation without burdening the environment and the health of employees. Only readily available bio-renewable substrates, such as hemoglobin, which is a waste product of the meat industry, and glycerin obtained from natural triglycerides, e.g. as a waste product in the production of biodiesel, are used for the production of adhesive. In the production of adhesives, it is possible to use waste, rainwater or process water after it has been properly filtered, and they do not require the use of fresh water-saltwater with a salinity up to 4% might be a base. Unlike the known adhesives, the production of the binding agent according to the invention does not require condensation processes, thus reducing $CO_2$ emissions to the atmosphere by more than 85%, it takes place at room temperature. They allow the binding of various materials containing cellulose, in particular those derived from annual plants, whose outer layers containing cuticula: kutin, kutan and waxes, constitute a significant percentage in the total fiber mass.

It is also surprisingly observed that in the case of the production of boards from waste materials emitting formaldehyde, the use of the binding agent according to the invention suppress the emission of formaldehyde by the glued product. The amount of formaldehyde emitted is much lower than the amount emitted by the same amount of formaldehyde emitting substrate—free or in compressed form.

In the production of binder, we observe significant energy savings through various types of mixing of components without the need for cooling or repeated heating as in the case of urea-formaldehyde adhesives used so far. The short synthesis time increases the production cycle speed in enterprises.

The above and other purposes are achieved by means of the adhesive compositions according to the invention, which include the compositions given in Table 1. The content of individual components is given in % wt. in the total mixture.

TABLE 1

Exemplary compositions of the binding agent according to the invention (% wt.).

| Example | 1 | 1A | 1B | 2 | 2A | 2B | 3 | 3A | 3B | 4 | 4A | 4B | 5 | 5A | 5B |
|---|---|---|---|---|---|---|---|---|---|---|---|---|---|---|---|
| Water | 62.9 | 35.9 | 34.9 | 41.9 | 46.9 | 45.9 | 59.9 | 27.9 | 39.9 | 40.9 | 48.45 | 58.9 | 49.9 | 54.9 | 69.9 |
| Defoaming agent | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Glycerin | 15 | 26 | 26 | 21 | 23 | 25 | 14 | 31 | 20 | 10 | 24 | 20 | 25 | 40 | 23 |
| Hemoglobin | 11 | 17 | 15 | 11 | 23 | 11 | 10 | | 10 | 7 | 24 | | 25 | 15 | 6 |
| Urea | | | | | | | 16 | 20 | 20 | 36 | | | | | |
| Sorbitol | 11 | 21 | 22 | 21 | | | | 10 | 10 | | | | | | |
| Casein | | | | | | | | | | | 4 | 2 | 4 | | |
| Gluten | | | | 5 | 7 | 3 | | | | | | | | | |
| NaOH | | | | | | | | | | | 2 | 1 | 2 | | |
| $KMnO_4$ | | | 2 | | | | 3 | | | | | | | | 1 |
| Animal proteins | | | | | | 12 | | 11 | | | | 15 | | | |

| Example | 6 | 6A | 6B | 7 | 7A | 7B |
|---|---|---|---|---|---|---|
| Water | 62.9 | 35.9 | 34.9 | 41.9 | 46.9 | 45.9 |
| Defoaming agent | 0.1 | 0.1 | 0.1 | 0.1 | 0.1 | 0.1 |
| Glycerin | 25 | 25 | 25 | 25 | 25 | 25 |
| Hemoglobin | 25 | 25 | 25 | 25 | 25 | 25 |
| Molasses | 2.5 | 5 | 7.5 | | | 5 |
| NaOH | | | | 0.5 | 0.5 | 0.5 |
| Oil | | | | | 5 | 5 |

Mixing of the solutions described above is preferably carried out in an inert environment and at a temperature of 10-38° C., especially 18-25° C.

The adhesive composition according to the invention, and in particular the kits described above have the advantage that they can be stored even at temperatures below 0° C., preferably at 10-25° C., particularly preferably 15-20° C. The binder does not cure and even after thawing is able to be used without losing its properties.

Furthermore, the binding agent stored at room temperature does not cure and does not change over time.

The following examples are presented to illustrate the wide variety of adhesive compositions and the various possibilities of their application on the cellulosic materials of the present invention.

Fibreboards

To produce medium density fiberboard, 3 mm thick, pine fiber mixed with the binding agent was used by spraying under appropriate conditions and forming a mat. The mass fraction of binder solid components was 10% by weight. The mat was pressed at 200° C. under pressure with a pressing time of 8 s/mm of board thickness.

| | |
|---|---|
| Board thickness [mm] | 3 |
| Fraction of adhesive solid components [%] | 10 |
| Pressing temperature [° C.] | 200 |
| Pressing time [s/mm] | 8 |

The above-mentioned parameters were determined as optimal on the basis of a number of tests carried out as part of the manufacture of 2-8 mm boards in terms of temperature and pressing time as well as the content of binding agent in the product.

Technical parameters in accordance with the PN-EN 622 standard were obtained for the MDF board. For each board created in this way, the technical properties were compared, paying particular attention to:
1. Tensile strength perpendicular to the plane of the board according to PN EN 319. The test was carried out according to the following scheme:
    Samples were taken and cut out according to EN 326-1: dimensions of samples 50×50 mm,
    The samples were covered with metal blocks carrying the load using hot melt adhesive
    Breaking load was recorded.
The results were then compared with the PN-EN 622-3 standard.
2. Water resistance of the glue joint. The thickness swelling tests were carried out after soaking in water according to PN-EN 317. The test was carried out according to the following scheme:
    Samples were taken and cut out according to EN 326-1: dimensions of samples 50×50 mm,
    The samples were placed in a water bath equipped with a thermostat to maintain a constant temperature during the test,
    24 hours of soaking in water at a temperature of (20±1)° C. The results obtained for fibreboards obtained with different embodiments of the binding agent according to the invention are described below.

Example 1

A one-component binder of composition 1 according to the above table was created by mixing the starting ingredients with water. Two exemplary polyols (i.e. glycerin and sorbitol) and a protein component were used for this purpose. Very good strength and swelling parameters were obtained for the product made in this way.

Taking into account the obtained results, in the next composition according to formula 1A, the percentage of all components was increased in order to increase the solids content in the binder, and thus the adhesive viscosity. After the swelling test no changes were observed, while the binding agent strength decreased significantly.

In formula 1B, the protein component was modified by adding $KMnO_4$ to the mixture. No changes were observed in the swelling test, however, an increase in the adhesive's tensile strength was demonstrated.

Example 2

The binder of composition 2 according to the table was mixed using the same percentage of polyols, reducing the protein content to formula 1 and the binder was enriched with the addition of 5% by weight gluten. Along with the increase in strength parameters, there was an increase in swelling by 5%.

Considering the fact that sorbitol is a hydrophilic substance, it was eliminated from the formula 2A, replacing its presence with higher amount of remaining ingredients. The swelling was at a comparable level, but the binding strength dropped significantly (over 60%).

In formula 2B, some hemoglobin has been replaced by other animal proteins. The strength parameters of the binder were comparable to the formula 2A, and the swelling was slightly higher, but still at the level meeting the standards for the P3 waterproof adhesive family.

Example 3

Urea was added to another adhesive joint 3 to modify protein structures. 16% urea was added to the basic glycerol-protein mixture contained in formula 1 according to the table. Very high strength values were obtained, however, it was associated with an increase in swelling. In addition, the binding agent obtained in this way did not have the desired solids content >45%. The density of the glue has decreased due to the presence of urea.

The percentage of water was reduced, the protein source changed to animal proteins, and an additional polyol was added to create formula 3A. Similar strength parameters were obtained as in the case of formula 3, significantly increasing the solids content in the binder to 60%.

During multiple modifications of adhesive mixture 3, the swelling values of 12% required for semi-hard boards used in humid conditions were obtained. What's more, it was accompanied by very high strength parameters. The adhesive combination corresponds to the four-component formula 3B.

Example 4

Casein was used for the next adhesive joint 4 to increase strength and improve product water resistance. Urea was also added to the mixture to reduce the adhesive density and increase the solids content. Satisfying results in the swelling test were achieved, however, the adhesive strength was not the highest. Similar strength results were obtained for the formula 4B, where the protein source was replaced with animal proteins. Swelling results, however, increased threefold, and the binder itself had to be used shortly after preparation, due to the unstable casein. After many modifications of the adhesive mixture with the addition of casein, very high strength values and a very good swelling test results were obtained, meeting the standard for semi-hard boards used in dry conditions (15%). The adhesive binder has reached the minimum amount of solids (>45%), and is stable over time (has a long service life). The adhesive combination corresponds to the six-component formula 4A.

Example 5

Formulas 5, 5A and 5B were modified using different proportions of the same ingredients. In formulas 5 and 5A, the desired amount of solids >45% and satisfying results in the strength test and swelling test were obtained.

In formula 5B, the protein component was modified with $KMnO_4$, obtaining very good results in the swelling test, and satisfactory strength results. The resulting binder does not, however, have the desired solids content >45%.

Example 6

It was decided to check the effect of molasses addition on the mechanical properties of the developed adhesive joints. The reason for its use is to increase the proportion of solids with a relatively cheap, liquid filler and to check its impact on the water resistance of the boards resulting from the oxygenation reaction of its aldehyde and ketone groups to carboxyl groups. In theory, this should only happen in an alkaline environment. It was surprisingly positively found that although molasses is 50% sugar, which should dissolve well in water and destroy the waterproofness of the board, it worked the opposite. It was observed with the use of formulas 6, 6A and 6B that with an appropriately selected amount of additive, the swelling results can be reduced, thus minimally improving the strength of the product. An additional advantage of using molasses is the ability to increase the amount of solids in the glue.

By observing the improvement in water resistance with the use of molasses, it can be concluded that the aldehyde and ketone groups of the molasses were converted to carboxyl groups.

Example 7

Rapeseed oil has largely been selected as an additive in order to increase the solids content of the glue and to check whether, thanks to its use, there is a possibility of transesterification of fats with amino, carboxyl or hydroxyl groups of the proteins contained in the base product. It was checked whether the transesterification contributed to the increased water resistance of the final product.

Transesterification takes place in an acidic or basic environment. To obtain the appropriate environment, it is necessary to introduce additives that change the reaction environment. For this purpose, the addition of NaOH was used. For formula 7A, an increase in perpendicular tensile strength was observed compared to formula 7. In both formulas, despite obtaining very good mechanical strength, it was not possible to achieve a significant improvement in water resistance. The combination of formulas 7A and 6A contributed to a significant improvement in resistance to moisture and changing weather conditions.

Example 8

Various types of products obtainable with the binding agent according to the invention.
3-Layer Chipboard To produce chipboards with a density of 620 kg/m$^3$, 16 mm thick, chips mixed with a binding agent by spraying were used. The percentage share of the outer and inner layers of the board was 17%/66%/17%, respectively. The mass fraction of binder solids was 10% wt. of the outer layer and 9 wt. of the inner layer, respectively. The tests were carried out on chips with 4-6% moisture before gluing and 8-12% after gluing. The material after gluing was arranged in parallel in the mold. The material was pre-compressed, then compressed at 210° C. Optimization of pressing times of 6 and 8 s/mm was carried out.

The adhesive composition for the production of chipboard should meet the following criteria:

1. Tensile strength perpendicular to the plane of the board according to PN EN 319. The test was carried out according to the following scheme:

Samples were taken and cut out according to EN 326-1: dimensions of samples 50×50 mm, The samples were covered with metal blocks carrying the load, Hot melt adhesive was used for gluing.

2. Water resistance of the adhesive joint. Thickness swelling tests were carried out after soaking in water according to PN-EN 317. The test was carried out according to the following scheme:

Samples were taken and cut out according to EN 326-1: dimensions of samples 50×50 mm, The samples were placed in a water bath equipped with a thermostat to maintain a constant temperature during the test, 24 hours soaking in water with a temperature (20±1) ° C.

Below, in Table 2, there is a summary of the results illustrating the properties of 3-layer chipboards obtained by using different embodiments of the adhesive joints according to the invention (described in Table 1).

TABLE 2

Properties of 3-layer chipboards with various binding agents.

| Binding agent | Pressing time [s/mm] | Tensile strength [N/mm$^2$] | Swelling [%] |
|---|---|---|---|
| 1 | 6 | 0.38 | 21.1 |
|   | 8 | 0.44 | 19.2 |
| 1A | 6 | 0.39 | 19.7 |
|    | 8 | 0.46 | 18.2 |
| 1B | 6 | 0.41 | 17.4 |
|    | 8 | 0.51 | 17.1 |
| 2 | 6 | 0.58 | 17.7 |
|   | 8 | 0.77 | 16.9 |
| 2A | 6 | 0.50 | 17.5 |
|    | 8 | 0.74 | 16.8 |
| 2B | 6 | 0.61 | 17.4 |
|    | 8 | 0.83 | 16.7 |
| 3 | 6 | 0.35 | 32.0 |
|   | 8 | 0.36 | 26.0 |
| 3A | 6 | 0.36 | 30.0 |
|    | 8 | 0.38 | 24.7 |
| 3B | 6 | 0.35 | 30.2 |
|    | 8 | 0.37 | 24.8 |
| 4 | 6 | 0.80 | 15.8 |
|   | 8 | 0.91 | 15.0 |
| 4A | 6 | 0.82 | 15.7 |
|    | 8 | 0.93 | 14.9 |
| 4B | 6 | 0.89 | 15.7 |
|    | 8 | 0.91 | 14.8 |
| 5 | 6 | 0.47 | 20.8 |
|   | 8 | 0.54 | 19.6 |
| 5A | 6 | 0.46 | 20.2 |
|    | 8 | 0.52 | 19.0 |
| 5B | 6 | 0.49 | 20.0 |
|    | 8 | 0.56 | 18.8 |

Table 3 presents the average results for individual adhesive groups at a given pressing time.

TABLE 3

Average parameters of 3-layer chipboards obtained with the use of binding agents belonging to individual adhesive groups.

| | Adhesive joint | | | | | | | | | |
|---|---|---|---|---|---|---|---|---|---|---|
| | 1-1B | | 2-2B | | 3-3B | | 4-4B | | 5-5B | |
| | Pressing time [s/mm] | | | | | | | | | |
| | 6 | 8 | 6 | 8 | 6 | 8 | 6 | 8 | 6 | 8 |
| Tensile strength [N/mm$^2$] | 0.39 | 0.47 | 0.56 | 0.78 | 0.35 | 0.37 | 0.84 | 0.92 | 0.47 | 0.54 |
| Swelling [%] | 19.4 | 18.2 | 17.5 | 16.8 | 25.2 | 30.7 | 15.7 | 14.9 | 20.3 | 19.1 |

The best results were obtained for adhesive joints from the 4-4B group for 8 s/mm pressing time. The results were compared with the PN-EN 312 standard. The result of 14.9% swelling after 24 hours meets the standards for P4 and P6 type adhesives, while the result of 0.92 N/mm$^2$ tensile strength meets the standards for P1-P7 type adhesives.

Adhesive joints from group 2-2B for both pressing times, and adhesive joints 1-1B for pressing time 8 s/mm, meet the standards of tensile strength perpendicular to the plane of the board for P1-P6 type adhesives. In contrast, adhesive joints according to formulas 1-1B for a pressing time of 6 s/mm meet the strength standards for P2 adhesives.

Single Layer Chipboard, Recycled

Legislation and legal directives prohibit the incineration of wood waste coated with any preservative, varnish, paint or adhesive, as well as sawdust from chipboard processing. This waste is largely unsuitable for reuse and its disposal must be strictly controlled. Incineration of hazardous waste must be carried out under special conditions and specially designed furnaces. It causes additional pollution and global warming. It is necessary to find a way to reuse this waste, thus transforming it into recycling material.

To produce chipboards with a density of 650 kg/m$^3$, thickness 16 mm, recycled chips mixed with the binding agent by spraying were used. Single-layer chipboard was made. The mass fraction of binder solids was 8, 10 and 12% by weight, respectively. The tests were carried out on chips with 4-6% moisture before gluing and 8-12% after gluing. The material after gluing was arranged in parallel in the mold. The material was pre-compressed, then compressed at 210° C. Optimization of pressing times of 6 and 8 s/mm was carried out for each of the percentages of adhesive mentioned above.

The adhesive composition for the production of chipboard should meet the following criteria:
1. Tensile strength perpendicular to the plane of the board according to PN EN 319. The test was carried out according to the following scheme:
   Samples were taken and cut out according to EN 326-1: dimensions of samples 50×50 mm,
   The samples were covered with metal blocks carrying the load,
   Hot melt adhesive was used for gluing.
2. Water resistance of the adhesive joint. Thickness swelling tests were carried out after soaking in water according to PN-EN 317. The test was carried out according to the following scheme:
   Samples were taken and cut out according to EN 326-1: dimensions of samples 50×50 mm,
   The samples were placed in a water bath equipped with a thermostat to maintain a constant temperature during the test,
   24 hours soaking in water with a temperature (20±1) ° C.

A lot of tests have been carried out on the recycling material to select the most optimal formula for this type of material. Below are the average results for individual adhesive joints 1A, 2, 2B, 4A, 5A. Table 4 presents parameters from the swelling test and tensile strength perpendicular to the board plane for various production parameters.

TABLE 4

Properties of 1-layer recycled chipboard with various binding agents.

| Example | Amount of adhesive joint [%] | Pressing time [s/mm] | Tensile strength [N/mm$^2$] | Swelling [%] |
|---|---|---|---|---|
| 1A | 8 | 6 | 0.44 | 17.8 |
| | | 8 | 0.65 | 15.2 |
| | 10 | 6 | 0.71 | 14.3 |
| | | 8 | 0.99 | 13.9 |
| | 12 | 6 | 0.76 | 14.0 |
| | | 8 | 0.82 | 13.6 |
| 2 | 8 | 6 | 0.51 | 17.8 |
| | | 8 | 0.68 | 15.1 |
| | 10 | 6 | 0.72 | 14.4 |
| | | 8 | 1.00 | 13.8 |
| | 12 | 6 | 0.77 | 14.0 |
| | | 8 | 0.83 | 13.5 |
| 2B | 8 | 6 | 0.55 | 17.6 |
| | | 8 | 0.70 | 15.0 |
| | 10 | 6 | 0.74 | 14.3 |
| | | 8 | 1.02 | 13.8 |
| | 12 | 6 | 0.80 | 13.9 |
| | | 8 | 0.84 | 13.4 |
| 4A | 8 | 6 | 0.56 | 17.5 |
| | | 8 | 0.72 | 14.9 |
| | 10 | 6 | 0.78 | 14.0 |
| | | 8 | 1.08 | 13.6 |
| | 12 | 6 | 0.81 | 13.8 |
| | | 8 | 0.86 | 13.4 |
| 5A | 8 | 6 | 0.42 | 17.9 |
| | | 8 | 0.62 | 15.2 |
| | 10 | 6 | 0.71 | 14.4 |
| | | 8 | 0.98 | 13.9 |
| | 12 | 6 | 0.75 | 14.1 |
| | | 8 | 0.82 | 13.6 |

The averaged results for individual percentages of adhesive joints in a given pressing time are presented below.

TABLE 5

Averaged parameters of 1-layer recycled chipboard obtained using different binding agent content.

| Amount of adhesive joint | 8% | | | | 10% | | | | 12% | | | |
|---|---|---|---|---|---|---|---|---|---|---|---|---|
| Pressing time [s/mm] | 6 | | 8 | | 6 | | 8 | | 6 | | 8 | |
|  | Min. | Max. | Min. | Max. | Min. | Max. | Min. | Max. | Min. | Max. | Min. | Max. |
| Tensile strength [N/mm$^2$] | 0.42 | 0.56 | 0.62 | 0.72 | 0.71 | 0.78 | 0.98 | 1.08 | 0.75 | 0.81 | 0.82 | 0.86 |
| Swelling [%] | 17.5 | 17.9 | 14.9 | 15.2 | 14.0 | 14.4 | 13.6 | 13.9 | 13.8 | 14.1 | 13.4 | 13.6 |

The best results were obtained for 10% wt. adhesive joints for pressing time 8 s/mm. The results were compared with the PN-EN 312 standard. The result of 13.6-13.9% swelling after 24 hours meets the standards for P3, P4 and P6 type adhesives, while the result 1.08 N/mm$^2$ tensile strength meets the standards for P1-P7 type adhesives.

The results for the samples with 12% by weight of the adhesive joint meet the swelling standards for P3, P4 and P6 adhesives, and the tensile strength perpendicular to the plane of the board meet standards for P1-P7 adhesives.

The results for samples with 8% by weight of the adhesive joint, for pressing time 8 s/mm meet swelling norms for P4 and P6 type adhesives, while for both pressing times they meet the tensile strength perpendicular to the plane of the board standards for type P1-P6 adhesives.

The results show that the adhesive resin discussed in the patent can be used in the production of recycled boards. The use of this solution will not only bring a number of benefits resulting from the elimination of formaldehyde-based adhesive (no toxicity, reduction of $CO_2$ emissions, the use of natural, renewable raw materials), but will also reduce environmental pollution by eliminating the need to burn wood-based waste. This will not only reduce the industry's greenhouse effect. Less tree felling will also contribute to this by reusing the material.

3-layer OSB Boards

OSB flakes mixed with a binding agent by spraying were used to produce 3-layer OSB boards with a density of 620 kg/m$^3$ and a thickness of 18 mm. The percentage share of the outer and inner layers of the board was 25%/50%/25%, respectively. The mass fraction of the binder solids was 10% by weight in both the outer and inner layers. The mass fraction of solids of the paraffinic emulsion was 3% in both layers. Tests were carried out on OSB flakes with a moisture content of 4-6% before gluing and 8-12% after gluing. After gluing, the material was placed parallel to the mold. The material was pre-compressed, then pressed at a temperature of 210° C. and a pressing time of 9 s/mm.

The adhesive composition for the manufacture of chipboard should meet the following criteria:

1. Tensile strength perpendicular to the plane of the board according to PN EN 319. The test was carried out according to the following scheme:

Samples were taken and cut according to EN 326-1 standard: sample dimensions 50×50 mm,     The samples were covered with load-bearing metal blocks,     Hot melt adhesive was used for gluing.

2. Water resistance of the adhesive joint. Thickness swelling tests were carried out after soaking in water according to PN-EN 317 standard. The test was carried out according to the following scheme:

Samples were taken and cut according to EN 326-1: sample dimensions 50×50 mm,     The samples were placed in a water bath equipped with a thermostat to maintain a constant temperature during the test,     24 h of soaking in water at a temperature of (20±1) ° C.

The results obtained for OSB boards obtained in different embodiments of the binding agent according to the invention are described below.

Due to the high water resistance requirements for OSB boards, even for the lowest product classes, 4-4B adhesives were selected for application. The casein content, as demonstrated in the previous examples, increases the strength and water resistance of the product.

OSB Board No. 1.

With the use of formula 4, satisfactory strength results meeting the requirements of OSB 1 class were achieved, but the result of the swelling test did not qualify this product to this class.

OSB Board No. 2.

Urea was removed to improve water resistance. For a satisfactory level of solids, the percentage of the remaining adhesive components was increased in return for urea.

Slightly better results on swelling were obtained with formula 4B, where the animal protein source was changed to animal proteins. The results obtained in the strength test and the test for swelling after soaking in water allowed the formula to be classified as OSB 1.

OSB Board No. 3.

The key factor enabling the use of casein in the formula is sodium hydroxide. Its addition dissolves the protein, allowing you to create a homogeneous mixture. Other alkaline agents that can replace sodium hydroxide have been tested in a wide range of experiments. In the formulas 4-4B in exchange for NaOH, calcium milk was used, among others, which is commonly used as a casein protein modifier. Unfortunately, in combination with the rest of the additives in the glue and the presence of hemoglobin or animal proteins, it resulted in gelation of the glue or deterioration of the water resistance of the products.

OSB board No. 4.

The percentage of glycerin and hemoglobin in formula 4A was increased so that the proportion of adhesive solids was satisfactory (>45%). It was possible to achieve very high strength values and a very good swelling test result, meeting the standard for OSB boards of the OSB 2 class.

OSB Board No. 5.

An additional factor to modify the protein with a slightly alkaline reaction and to increase the water resistance of the final product was sodium bicarbonate. The formula with the least amount of casein—4A was selected, then sodium bicarbonate was added instead of sodium hydroxide. Casein failed to dissolve. Therefore, it was used as an additive to the already finished mixture. It was supposed to increase the water resistance of the final product and to make the mixture more fluid. Unfortunately, this addition caused problems with the production of the boards. The products were unstable or, depending on the amount of additive, disintegrated in the press. Additionally, a decrease in the water resistance of the boards was observed in the swelling test of samples after soaking in water for 24 hours.

Plywood Boards

For the production of 9-layer plywood, 12 mm thick, pine veneers were used, coated with a binding agent by spreading with a paint roller. The binder content was 160 kg/m². The material was pre-compressed for 10 minutes, then pressed at the temperature of 130° C. and a pressing time of 1 min/mm.

The adhesive composition for the production of class 1 plywood should meet the following criteria:

1. Shear strength according to PN EN 314-1. The study was carried out according to the following scheme:

Samples were taken and cut according to PN EN 314-1 standard.

The samples were placed in a water bath equipped with a thermostat to maintain a constant temperature during the test, 24 h of soaking in water at a temperature of (20±3) ° C.

The samples were taken out of the water and dried with a paper towel to remove excess water.

The samples were placed in the holders of the testing machine.

The shear strength was calculated in accordance with the PN-EN 314-1 standard and compared with the PN-EN 314-2 standard.

The results obtained for plywood obtained in different embodiments of the binder according to the invention are described below.

2. Shear in wood according to PN-EN 314-1.

Following the shear strength test, the samples were dried overnight.

The percentage of shear in wood was determined in accordance with Annex A to PN-EN-1.

Plywood Board 1.

For adhesive joint 1, no shaer in wood was observed, however, the adhesive met the requirements for plywood 1 as the shear strength result was >1 N/mm². Increasing the amount of sorbitol addition in the case of the glue joint 1A and 1B caused the strength to decrease fourfold.

Plywood Board 2.

The sufficient strength for the glue joint was not obtained. Removal of sorbitol from the mixture allowed for the observation of a minimal shear in the wood—about 10%. The results met the standard for class 1 plywood.

The addition of animal proteins and potassium permanganate to the formula resulted in a 10% increase in strength.

Straw Boards

It was also checked whether the developed formulas of adhesive joints are suitable for gluing other non-wood based materials containing cellulose. It was checked that the adhesives bond to the paraffin-containing materials. Such materials include, among others: straw from cereals, rice, rape, poppy, corn, flax, sunflower. These are waste materials from agriculture, the use of which would significantly reduce tree felling. In Poland, these are annual plants, whose harvest is once or twice a year, however, in other parts of the world, the harvest is year-round. So far, no good solution for gluing this type of material has been found on the market. Due to the fact that urea-formaldehyde adhesives do not cope with gluing of this type of components, the production uses a highly toxic binder which is pMDI.

Cereal straw boards were made. The straw was processed to obtain a material similar in size to the faction that is used to make the outer layers of chipboard.

Straw boards with a density of 850 kg/m³, thickness 3 mm, were made by applying a binding agent to straw dust by spraying. The mass fraction of binder solids was 10% by weight, respectively. The tests were carried out on straw material with 11-14% moisture before gluing and 15-19% moisture after gluing. The material after gluing was arranged in parallel in the mold. The material was pressed at 190° C. The pressing time was set at 8 s/mm.

The strength and water resistance parameters of the resulting product were checked according to the following criteria:

1. Tensile strength perpendicular to the plane of the board according to PN EN 319. The test was carried out according to the following scheme:

Samples were taken and cut out according to EN 326-1: dimensions of samples 50×50 mm, The samples were covered with load-bearing metal blocks using hot melt adhesive.

2. Water resistance of the glue joint. Thickness swelling tests were carried out after soaking in water according to PN-EN 317. The test was carried out according to the following scheme:

Samples were taken and cut out according to EN 326-1: dimensions of samples 50×50 mm, The samples were placed in a water bath equipped with a thermostat to maintain a constant temperature during the test, 24 hours soaking in water with a temperature (20±1) ° C.

TABLE 6

Properties of straw boards with various binding agents.

| Adhesive joint | 3A | | 5A | |
| --- | --- | --- | --- | --- |
| Tensile strength [N/mm²] | Min. | Max. | Min. | Max. |
| | 0.35 | 0.39 | 0.52 | 0.58 |
| Swelling [%] | 42 | 46 | 28 | 31 |

Environmentally friendly adhesive compositions based on proteins are suitable for wrapping non-wood, cellulose-based materials. Earlier it was possible only with the use of pMDI resins, which consist of non-renewable raw materials and are very toxic to the environment and people.

Coconut Fiber Boards

Coconut fiber is a potential fiberboard material containing high amounts of cellulose and wood-like lignin. For the production of fiberboards with a density of 600 kg/m³ and a thickness of 7 mm, coconut fiber mixed with a binder was used by spraying under suitable conditions to form a mat. The mass fraction of the binder solids was 13% by weight. The mat was pressed at the temperature of 230° C. under pressure with the pressing time of 10 s/mm of the board thickness.

Formula 5 and its combination with a 5% addition of various types of emulsions currently used in industry were used to produce boards according to the above parameters. Dedicated emulsions came from Sasol, i.e. Hydrowax PRO A14, PRO A18, HW540 and Syntec Blue. They were used to improve the parameters of the boards, mainly water resistance.

Considering both parameters listed in the table, the Hydrowax Emulsion PRO A18 and HW 540 seem to be the most effective. However, all the technical parameters obtained for the MDF board comply with the PN-EN 622 standard.

TABLE 7

Properties of coconut fiber boards with different types of emulsions.

| Binding agent | Emulsion | Tensile strength [N/mm$^2$] | Swelling [%] |
|---|---|---|---|
| 5 | — | 0.73 | 52.70 |
|   | PRO A14 | 1.82 | 27.52 |
|   | PRO A18 | 1.60 | 17.60 |
|   | HW 540 | 1.51 | 17.27 |
|   | Syntec Blue | 1.38 | 22.26 |

Figure 3:
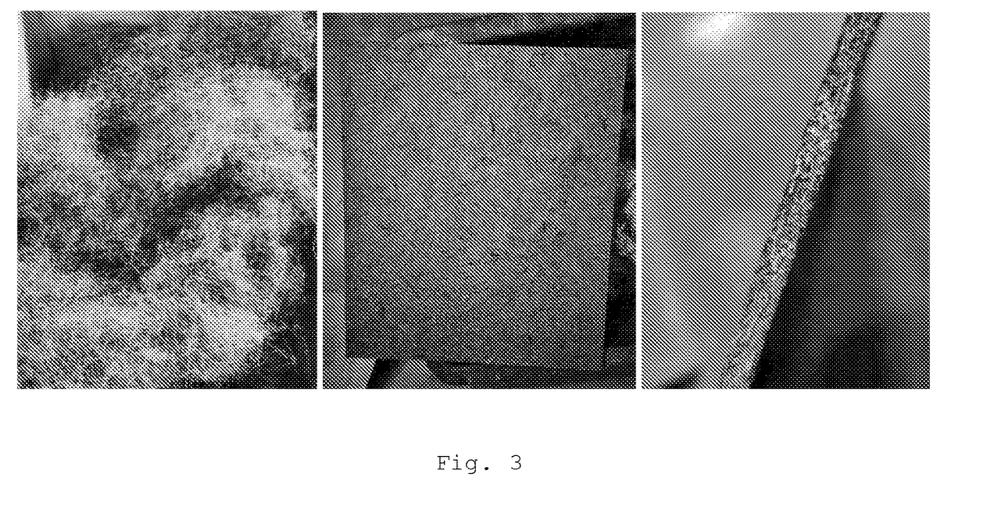
FIG. 3 shows pictures of coconut fibre and boards obtained therefrom.

FIG. 3 shows pictures of coconut fibre and boards obtained therefrom.

Cork Boards

For the production of cork boards with a density of 170 kg/m$^3$ and a thickness of 18 mm, cork was used mixed with a binder by spraying. The mass fraction of the binder solids was 12% by weight, respectively. Tests were carried out on a cork with a moisture content of 6% before gluing and 12% after gluing. After gluing, the material was placed parallel to the mold. The material was pre-pressed, then pressed at the temperature of 120° C. for 6 minutes.

Table 8 below summarizes the results showing the properties of the cork boards obtained by using different embodiments of the adhesive joints according to the invention (described in Table 1).

TABLE 8

Properties of cork boards with various binding agents.

| Adhesive joint | 6A | | 6B | |
|---|---|---|---|---|
| Tensile strength [N/mm$^2$] | Min. | Max. | Min. | Max. |
|  | 0.23 | 0.26 | 0.3 | 0.37 |
| Swelling [%] | 4.8 | 5.5 | 2.9 | 4.2 |

Figure 4:
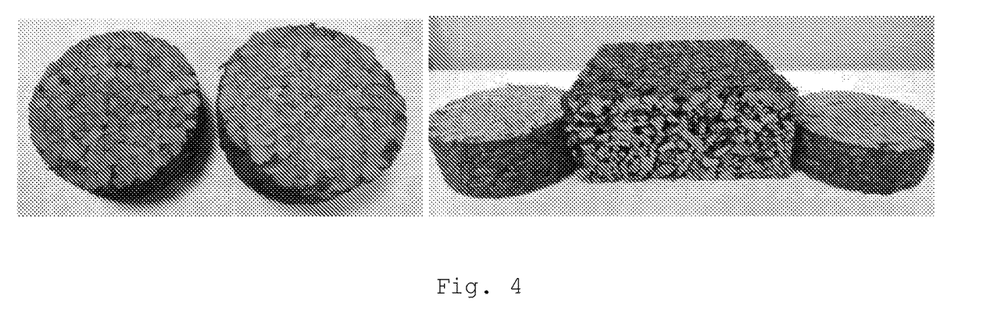
FIG. 4 shows pictures of cork boards.
Figure 5:
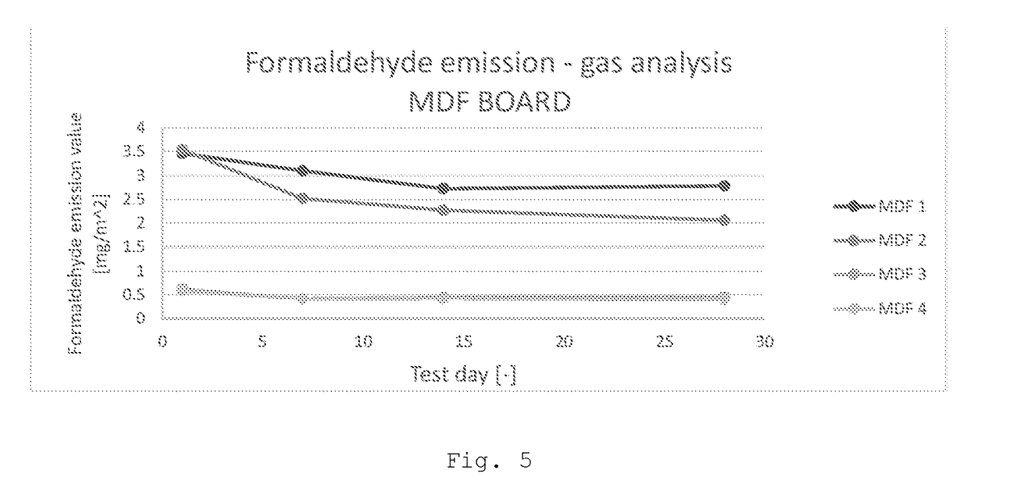
FIG. 5 displays gas analysis results presented in Tables
Figure 6:
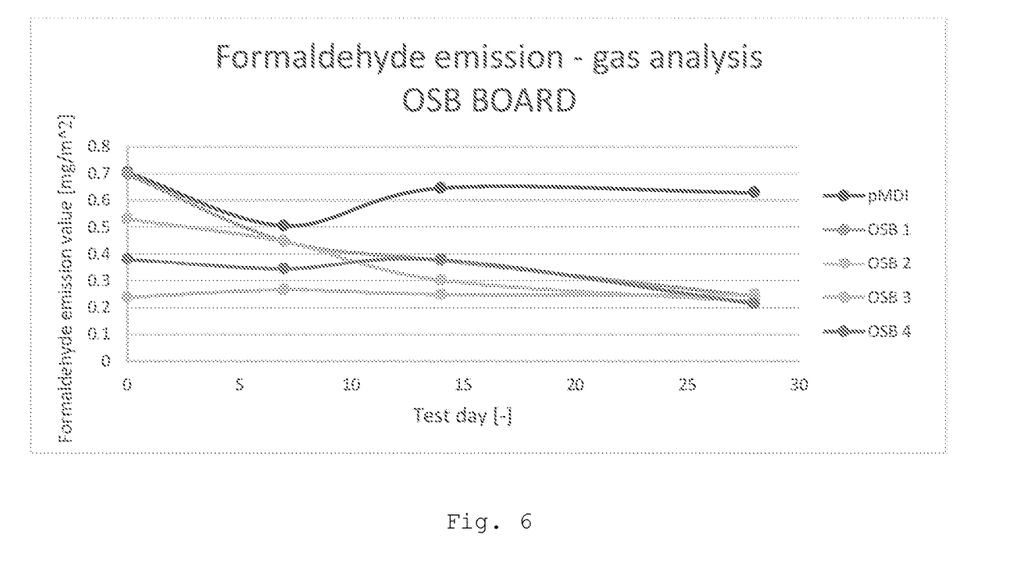
FIG. 6 displays gas analysis results presented in Tables 9-12.
Figure 7:
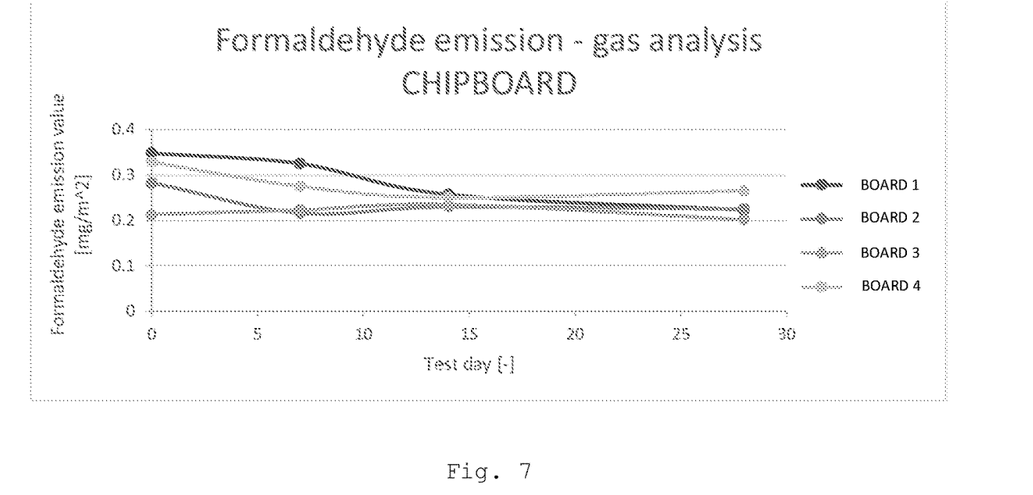
FIG. 7 displays gas analysis results presented in Tables 9-12.
Figure 8:
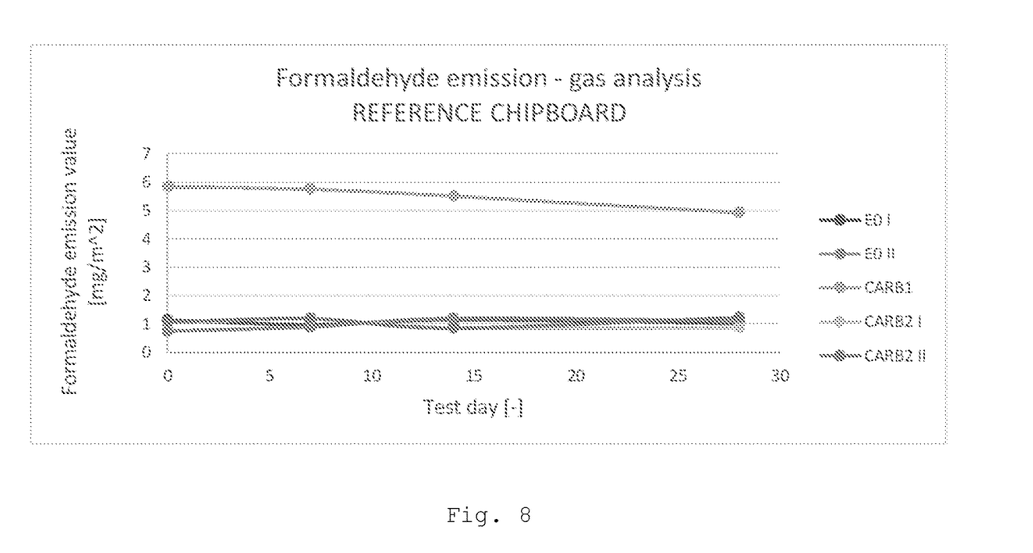
FIG. 8 displays gas analysis results presented in Tables 9-12.

FIG. 4 shows pictures of cork boards.

Example 9. Testing Formaldehyde Emission

The formaldehyde emission test was carried out with various types of products obtained according to the invention. For this purpose, the gas analysis method was used.

The gas analysis method consists in determining the value of formaldehyde emission from a board sample 5 cm wide and 40 cm long. The thickness of the sample depended on the thickness of the tested product. The cut surfaces were insulated with aluminum self-adhesive tape so that formaldehyde was released only from the top and bottom surface of the sample.

The test was carried out in accordance with the PN-EN ISO 12460-3 standard. In each case, two samples from the same plate were placed in the gas analyzer, and the result of a single test was calculated as the average of the two values.

Each of the samples, after covering, was placed in a separate measuring chamber, in which equal temperature conditions 60±0.5° C. were maintained. The air flow through each of the chambers was set in accordance with the standard at 60±3 liters per hour. The formaldehyde released from the plate is mixed with the air flowing through the chamber and is absorbed in the water placed in the glass washers.

The gas analysis results obtained are presented in Tables 9-12 and FIGS. 5-8 below.

TABLE 9

The results of the gas analysis made with the use of adhesive joint no. 5 on MDF boards.

MDF BOARD

| | | | DAY | | | | | | |
|---|---|---|---|---|---|---|---|---|---|
| | | | 0 | | 7 | | 14 | | 28 | |
| | | | RESULT | AVERAGE VALUE | RESULT | AVERAGE VALUE | RESULT | AVERAGE VALUE | RESULT | AVERAGE VALUE |
| TEST BOARD, GLUE No. 5 | 1 | CHAMBER A | 3.915 | 3.463 | 3.217 | 3.098 | 3.080 | 2.722 | 2.997 | 2.781 |
| | | CHAMBER B | 3.010 | | 2.978 | | 2.364 | | 2.564 | |
| | 2 | CHAMBER A | 4.159 | 3.541 | 2.818 | 2.513 | 2.338 | 2.273 | 2.385 | 2.061 |
| | | CHAMBER B | 2.922 | | 2.208 | | 2.207 | | 1.736 | |
| | 3 | CHAMBER A | 0.624 | 0.616 | 0.416 | 0.418 | 0.432 | 0.440 | 0.436 | 0.447 |
| | | CHAMBER B | 0.608 | | 0.420 | | 0.447 | | 0.457 | |
| | 4 | CHAMBER A | 0.566 | 0.586 | 0.417 | 0.417 | 0.420 | 0.422 | 0.391 | 0.401 |
| | | CHAMBER B | 0.606 | | 0.416 | | 0.423 | | 0.410 | |

TABLE 10

The results of the gas analysis made with the use of glue joint no. 5 on OSB boards.

OSB BOARD

| | | | DAY | | | | | | |
|---|---|---|---|---|---|---|---|---|---|
| | | | 0 | | 7 | | 14 | | 28 | |
| | | | RESULT | AVERAGE VALUE | RESULT | AVERAGE VALUE | RESULT | AVERAGE VALUE | RESULT | AVERAGE VALUE |
| REFERENCE BOARD | MDI GLUE | CHAMBER A | 0.609 | 0.704 | 0.576 | 0.505 | 0.654 | 0.645 | 0.612 | 0.628 |
| | | CHAMBER B | 0.798 | | 0.433 | | 0.636 | | 0.644 | |
| TEST BOARD No. 5 | 1 | CHAMBER A | 0.577 | 0.697 | 0.463 | 0.449 | 0.331 | 0.375 | 0.254 | 0.241 |
| | | CHAMBER B | 0.816 | | 0.435 | | 0.418 | | 0.227 | |
| | 2 | CHAMBER A | 0.463 | 0.530 | 0.448 | 0.446 | 0.302 | 0.301 | 0.228 | 0.221 |
| | | CHAMBER B | 0.597 | | 0.443 | | 0.300 | | 0.214 | |
| | 3 | CHAMBER A | 0.227 | 0.237 | 0.271 | 0.265 | 0.215 | 0.248 | 0.243 | 0.247 |
| | | CHAMBER B | 0.246 | | 0.259 | | 0.281 | | 0.250 | |
| | 4 | CHAMBER A | 0.409 | 0.380 | 0.343 | 0.343 | 0.418 | 0.378 | 0.166 | 0.213 |
| | | CHAMBER B | 0.350 | | 0.342 | | 0.337 | | 0.259 | |

TABLE 11

The results of the gas analysis made with the use of glue joint no. 5 on chipboards.

CHIPBOARD

| | | | DAY | | | | | | |
|---|---|---|---|---|---|---|---|---|---|
| | | | 0 | | 7 | | 14 | | 28 | |
| | | | RESULT | AVERAGE VALUE | RESULT | AVERAGE VALUE | RESULT | AVERAGE VALUE | RESULT | AVERAGE VALUE |
| TEST BOARD No. 5 | 1 | CHAMBER A | 0.376 | 0.348 | 0.356 | 0.325 | 0.258 | 0.257 | 0.268 | 0.223 |
| | | CHAMBER B | 0.319 | | 0.293 | | 0.256 | | 0.177 | |
| | 2 | CHAMBER A | 0.307 | 0.283 | 0.228 | 0.216 | 0.238 | 0.230 | 0.235 | 0.225 |
| | | CHAMBER B | 0.258 | | 0.203 | | 0.222 | | 0.215 | |
| | 3 | CHAMBER A | 0.200 | 0.213 | 0.227 | 0.223 | 0.222 | 0.235 | 0.199 | 0.202 |
| | | CHAMBER B | 0.226 | | 0.219 | | 0.247 | | 0.204 | |
| | 4 | CHAMBER A | 0.312 | 0.328 | 0.261 | 0.275 | 0.219 | 0.250 | 0.298 | 0.265 |
| | | CHAMBER B | 0.343 | | 0.288 | | 0.281 | | 0.232 | |

TABLE 12

The results of the gas analysis made with reference urea-formaldehyde resins on chipboards.

CHIPBOARD-REFERENCE CHIPBOARDS

| | | | DAY | | | | | | |
|---|---|---|---|---|---|---|---|---|---|
| | | | 0 | | 7 | | 14 | | 28 | |
| | | | RESULT | AVERAGE VALUE | RESULT | AVERAGE VALUE | RESULT | AVERAGE VALUE | RESULT | AVERAGE VALUE |
| E0 I | | CHAMBER A | 1.161 | 1.129 | 0.922 | 0.972 | 1.163 | 1.140 | 1.020 | 1.016 |
| | | CHAMBER B | 1.097 | | 1.021 | | 1.116 | | 1.012 | |
| E0 II | | CHAMBER A | 0.818 | 0.749 | 0.915 | 0.894 | 1.167 | 1.193 | 0.996 | 1.107 |
| | | CHAMBER B | 0.680 | | 0.872 | | 1.218 | | 1.218 | |
| CARB 1 | | CHAMBER A | 5.945 | 5.841 | 5.999 | 5.751 | 6.572 | 5.506 | 5.706 | 4.929 |
| | | CHAMBER B | 5.737 | | 5.503 | | 4.440 | | 4.152 | |
| CARB 2 I | | CHAMBER A | 1.010 | 1.033 | 1.200 | 1.177 | 0.860 | 0.856 | 0.947 | 0.875 |
| | | CHAMBER B | 1.056 | | 1.153 | | 0.852 | | 0.803 | |
| CARB 2 II | | CHAMBER A | 1.057 | 1.065 | 1.134 | 1.183 | 0.874 | 0.853 | 1.215 | 1.224 |
| | | CHAMBER B | 1.073 | | 1.231 | | 0.831 | | 1.233 | |

Moreover, an additional analysis of formaldehyde emission from the MDF board obtained according to the invention was performed using the chamber method for this purpose.

The chamber method is based on the study of formaldehyde emission from wood-based panels in specially adapted test chambers. Test specimens with a specific surface area are placed in a chamber in which temperature, relative humidity, air flow rate and frequency of its exchange are controlled and maintained at the constant levels specified in PN-EN 717-1.

Two 11-millimeter thick MDF boards were tested with the chamber method. The conditions for preparing the boards, which include temperature, material humidity and pressing time, were the same for both. The first board was made without the addition of glue, pressing the pure material, and the second with the addition of glue No. 5. During exposure in the test chamber under specific climatic conditions and air exchange, the samples of the analyzed boards emitted various amounts of formaldehyde. Formaldehyde concentrations given in ppm (parts per million) in the 1st, 2nd, 3rd, 6th, 7th, 8th, 9th and 10th day of exposure are presented in Table 13. For the purposes of this study, glass chambers with a volume of 1 $m^3$ were used, in which two samples with a total surface area of 1 $m^2$. The formaldehyde released from the samples is mixed with the chamber air which is periodically passed through a set of two washers. This compound is absorbed in water and its concentration is given in milligrams per cubic meter of the board. The periodic intake of air from the chamber is continued until the measured value reaches a steady state. This is the state where the formaldehyde emission of the wood-based panel is nearly constant under the test conditions.

HCHO concentrations for the tested boards differed throughout the exposure period. The nature of changes in formaldehyde concentration observed in both cases was similar. On the second day of exposure, the maximum emission was achieved, which for the board without glue was at the level of 0.155 ppm and 0.076 ppm for the board with glue.

Figure 9:
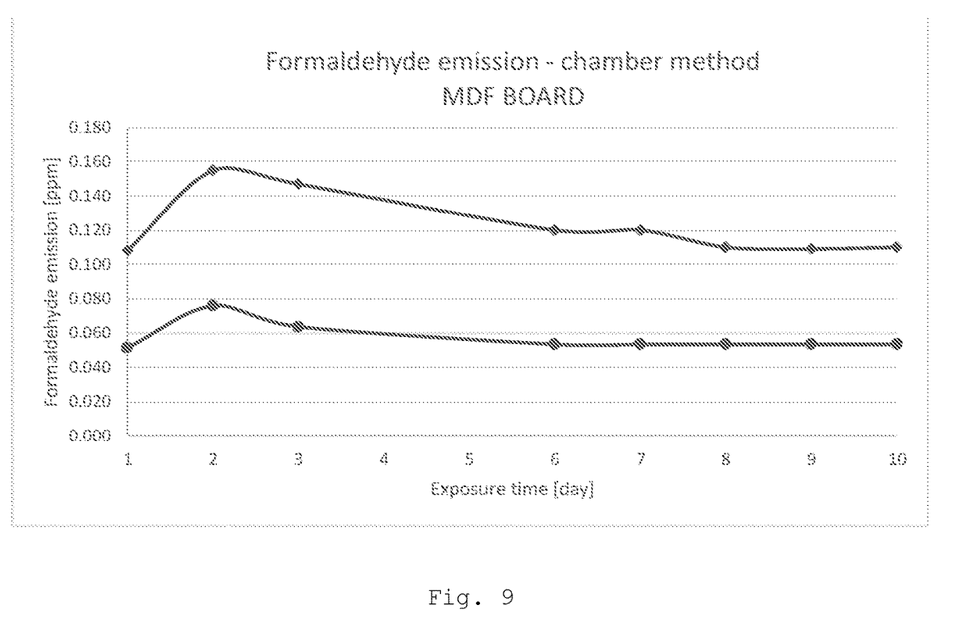
FIG. 9 are results of the emission measurement of MDF board made with the chamber method presented in Table 13.

The obtained results of the emission measurement of MDF board made with the chamber method are presented in Table 13 and FIG. 9.

TABLE 13

Formaldehyde concentrations for MDF boards depending on the exposure in the test chamber.

| | Exposure time [day] | | | | | | | |
|---|---|---|---|---|---|---|---|---|
| | 1 | 2 | 3 | 6 | 7 | 8 | 9 | 10 |
| Emission value for MDF board without binding agent [ppm] | 0.108 | 0.155 | 0.147 | 0.120 | 0.120 | 0.110 | 0.109 | 0.110 |
| Emission value for MDF board with glue No. 5 [ppm] | 0.051 | 0.076 | 0.064 | 0.053 | 0.053 | 0.053 | 0.053 | 0.053 |

The invention claimed is:
1. A binding agent for a cellulose-containing material comprising:
   a protein component based on animal blood in an amount from 5% to 25% by weight of the binding agent,
   a polyhydric alcohol comprising from 2 to 6 —OH groups in an amount from 5% to 45% by weight of the binding agent,
   a defoaming agent in an amount from 0.1% to 5% by weight of the binding agent, and
   water up to 100% by weight of the binding agent,
wherein said binding agent does not comprise an ammonium salt and does not comprise formaldehyde.

2. The binding agent according to claim 1, wherein the binding agent further comprises urea in an amount from 0% to 36% by weight of the binding agent.

3. The binding agent according to claim 1, wherein the binding agent further comprises casein in an amount from 0.2% to 4% by weight of the binding agent.

4. The binding agent according to claim 1, wherein the binding agent further comprises gluten in an amount from 0.5% to 7% by weight of the binding agent.

5. The binding agent according to claim 1, wherein the binding agent further comprises NaOH in an amount from 0.1% to 2% by weight of the binding agent.

6. The binding agent according to claim 1, wherein the binding agent further comprises $KMnO_4$ in an amount from 0.4% to 3% by weight of the binding agent.

7. The binding agent according to claim 1, wherein the binding agent further comprises molasses in an amount from 1% to 8% by weight of the binding agent.

8. The binding agent according to claim 1, wherein the binding agent further comprises vegetable oil in an amount from 0.5% to 10% by weight of the binding agent.

9. The binding agent according to claim 1, wherein the defoaming agent comprises a mixture of alkoxylated fatty alcohols.

10. A composite material product obtainable by binding a cellulose-containing starting material with the binding agent according to claim 1 to form the composite material product.

11. The composite material product according to claim 10, wherein the starting material is wood, straw from cereals, rice, rapeseed, poppy, corn, flax, sunflower, paper, or a combination thereof.

12. The composite material product according to claim 10, wherein the composite material product is in the form of a board.

13. The binding agent of claim 1, wherein the polyhydric alcohol is glycerin or sorbitol.

14. The binding agent of claim 13, wherein the polyhydric alcohol is glycerin in an amount from 14% to 40% by weight of the binding agent.

15. The binding agent of claim 1, wherein the defoaming agent is in an amount from 1% to 2% by weight of the binding agent.

16. The binding agent of claim 1, wherein the defoaming agent is in an amount from 0.1% to less than 0.5% by weight of the binding agent.

17. The binding agent of claim 2, wherein the urea is in an amount from 16% to 36% by weight of the binding agent.

18. The binding agent of claim 3, wherein the casein is in an amount from 2% to 4% by weight of the binding agent.

19. The binding agent of claim 4, wherein the gluten is in an amount from 3% to 7% by weight of the binding agent.

20. The binding agent of claim 5, wherein the NaOH is in an amount from 1% to 2% by weight of the binding agent.

21. The binding agent of claim 6, wherein the $KMnO_4$ is in an amount from 1% to 3% by weight of the binding agent.

22. The binding agent of claim 7, wherein the molasses is in an amount from 4% to 6% by weight of the binding agent.

23. The binding agent of claim 8, wherein the vegetable oil is in an amount from 2.5% to 7.5% by weight of the binding agent.

24. The binding agent of claim 1, wherein the protein component comprises a protein concentrate from animal blood.

25. The binding agent of claim 24, wherein the protein concentrate is hemoglobin from animal blood.

26. The binding agent of claim 17, wherein the alkoxylated fatty alcohols are ethoxylated alcohols, propoxylated C16-C18 alcohols, or a mixture thereof.

27. The composite material product according to claim 11, wherein the starting material is wood fiber or wood chips.

28. The composite material product according to claim 12, wherein the composite material product is a pressed board or a laminate board.

* * * * *